United States Patent [19]
Brune

[11] Patent Number: 5,923,254
[45] Date of Patent: Jul. 13, 1999

[54] PROGRAMMABLE ANIMAL COLLAR

[75] Inventor: Scott A. Brune, Leo, Ind.

[73] Assignee: Innotek Pet Products, Inc., Garrett, Ind.

[21] Appl. No.: 09/014,948

[22] Filed: Jan. 28, 1998

Related U.S. Application Data

[60] Provisional application No. 60/036,522, Jan. 29, 1997.

[51] Int. Cl.$^6$ .................................................. G08B 21/00
[52] U.S. Cl. .................................... 340/573.3; 340/573.1; 455/100; 455/103; 455/129
[58] Field of Search ............................. 340/573.3, 573.1; 455/100, 103, 129

[56] References Cited

U.S. PATENT DOCUMENTS 5,652,569  7/1997  Gerstenberger et al. ............... 455/100

*Primary Examiner*—Glen Swann
*Attorney, Agent, or Firm*—Barnes & Thornburg

[57] ABSTRACT

A field programmable tracking device which includes a programmably channelized multichannel transmitter. The transmitter includes a magnetically operable circuit which allows external programmability of transmission channel selection. Activation of the magnetically operable circuit for a first period of time activates a microcontroller. Continued activation of the magnetically operable circuit for a second period of time causes the microcontroller to initiate a verified channel count. Once a desired channel count is verified, activation of the magnetically operable circuit is stopped to select the desired channel. The transmitter is provided with a flexible antenna. Both the transmitter and the flexible antenna can be coupled to a collar.

19 Claims, 11 Drawing Sheets

5,923,254

PROGRAMMABLE ANIMAL COLLAR

RELATED APPLICATION

This application is based on U.S. Provisional Application Ser. No. 60/036,522, filed Jan. 29, 1997, the complete disclosure of which is hereby expressly incorporated by reference.

TECHNICAL FIELD

The present invention relates to animal collars. More particularly, the present invention relates to animal collars which are equipped with radio transmitters that are used for locating or tracking purposes.

BACKGROUND ART

There are numerous animal collars available which include radio transmitters that are used to track and locate various types of animals, particularly hunting dogs. Such collars conventionally utilize crystal controlled, single frequency transmitters. Federal regulation limits the frequency band reserved for the tracking of and telemetry of scientific data from animal wildlife to 216–220 MHZ. Accordingly, there are a limited number of channels available for conventional, single frequency transmitters. This can lead to problems when one confronts a situation in which two or more animals are tagged with transmitters that transmit over the same frequency or channel, or when one or more animals are tagged with transmitters that transmit over interfering frequencies or channels. In such cases, it can be difficult or impossible at times to accurately track more than one animal.

The present invention is directed to a programmable animal collar which allows for field selection of transmission frequencies or channels.

DISCLOSURE OF THE INVENTION

Among the following recited features and other features and characteristics of the present invention which will become apparent as the description thereof proceeds below, the present invention provides a tracking device which includes:

a collar;

a transmitter mounted to the collar in a transmitter housing; and a flexible antenna extending from the transmitter housing, wherein the transmitter comprises a multichannel transmitter which includes a magnetically operable circuit which allows external programmability of transmission channel selection.

The present invention also provides a tracking device which includes:

a collar;

a transmitter mounted to the collar in a transmitter housing; and a flexible antenna extending from the transmitter housing, wherein the transmitter comprises a programmably channelized multichannel transmitter.

The present invention further provides a method of externally programming a multichannel transmitter which involves:

providing a multichannel transmitter with a microcontroller and magnetically operable circuit which allows external programmability of transmission channel selection;

activating the magnetically operable circuit for a first period of time to activate a microcontroller;

activating the magnetically operable circuit for a second period of time to cause the microcontroller to initiate a verified channel count; and stopping activation of the magnetically operable circuit when the microcontroller has verified a desired channel count.

BRIEF DESCRIPTION OF DRAWINGS

The present invention will be described hereafter with reference to the attached drawings which are given as non-limiting examples only, in which:

FIG. 3b is a bottom view of the PC board of FIG. 3a.

DESCRIPTION OF THE INVENTION

The present invention is directed to animal collars which include programmable transmitters. The transmitters are particularly designed to be field programmable. The transmitters are programmably channelized multichannel transmitters. In this regard, the transmitters of the present invention are designed in such a manner that the user can select between a multiplicity of frequencies or channels and program the transmitter by non-mechanical means in a field environment so that the transmitter transmits over a selected frequency or channel. The use of the term "non-mechanical" is intended to contrast the present invention from the use of "mechanical" means such as mechanical switches, jumpers, and the like. Such mechanical means may be used. However, their use would require that they be surface mounted or located under an access plate or cover which would have to be removed to make necessary setting changes. In the present invention, the transmitters are externally field tuned to any one of a number of frequencies or channels externally. This allows for the use of a sealed unit and avoids the use of exposed mechanical switches or the need for tools to open access plates or covers. A sealed unit, or one that otherwise has provisions for a replaceable battery, is more suitable for use in rough field conditions which may include inclement weather.

The animal collars of the present invention are generally described herein as being useful for tracking and locating dogs, e.g. hunting dogs. Nevertheless, it is to be understood that the animal collars of the present invention are not to be considered as limited for use on hunting dogs or dogs in general. In this regard, the animal collars of the present invention could be used to track any type of domestic or non-domestic animal. Moreover, it is to be understood that the programmable transmitters of the present invention could be used separately from collars, or could otherwise be mounted on other support means. For example, the transmitters of the present invention could be mounted to belts, leg bands, arm bands, wrist bands, backpack shoulder straps, horse saddles or carried separately and used to locate lost hikers, backpackers, horseback riders, cavers, miners, mentally deficient persons, and the like. In addition, the programmable transmitters could be used to tag a base such as a campsite, a pier or dock, a parked vehicle, etc. so that such a base could be found with a directional locating receiver. It is also possible to utilize the present invention in conjunction with a transponder rather than a transmitter.

Figure 1:
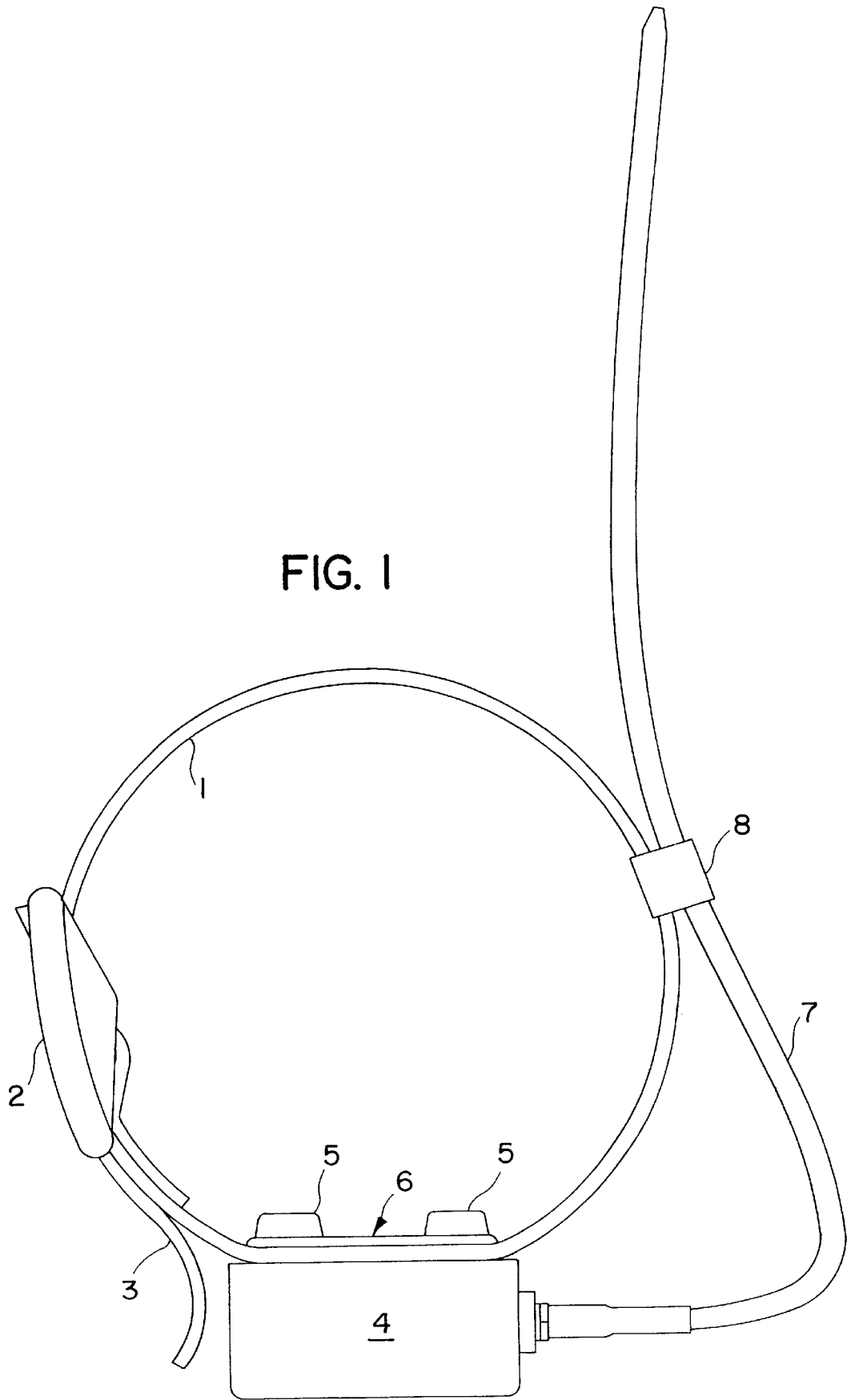
FIG. 1 is a front view of an animal collar that is equipped with a radio transmitter according to the present invention.

FIG. 1 is a front view of an animal collar that is equipped with a radio transmitter according to the present invention. As depicted in FIG. 1, the animal collar includes a strap or web 1 which can be made from a suitable material such as nylon or leather. A conventional buckle 2 is attached to one end of the strap or web 1. The buckle 2 receives a free end 3 of the strap or web 1 and secures the free end 3 at adjustable increments in a known manner. The transmitter 4 is mounted on a lower portion of the collar along strap or web 1. The transmitter 4 can be secured to strap or web 1 according to any convenient manner. For example, transmitter 4 can be secured to strap or web 1 by mechanical fasteners 5, e.g. screws, bolts, rivets, etc. which pass through strap or web 1 and clamping plate 6 from (or into) the housing of transmitter 4.

A flexible antenna 7 extends out of the transmitter 4 and is directed upward by guide member 8 which is attached to a side portion of the strap or web 1. In alternative embodiments, the antenna may be coupled to the transmitter by a wiring system and have a separate base which is attached to the strap or web.

The collar of FIG. 1 is used for tracking and locating an animal. Further embodiments of a collar according to the present invention may include receivers, transponders and/or other electronic elements which are attached to the collar. For example, the collar may be provided with an audible or visual locating device such as a sonic means or illumination means which can be activated remotely. In addition, the collar may be provided with a stimulation means such as a pair of electrodes which can be activated to administer a corrective signal as needed for training.

Figure 2A:
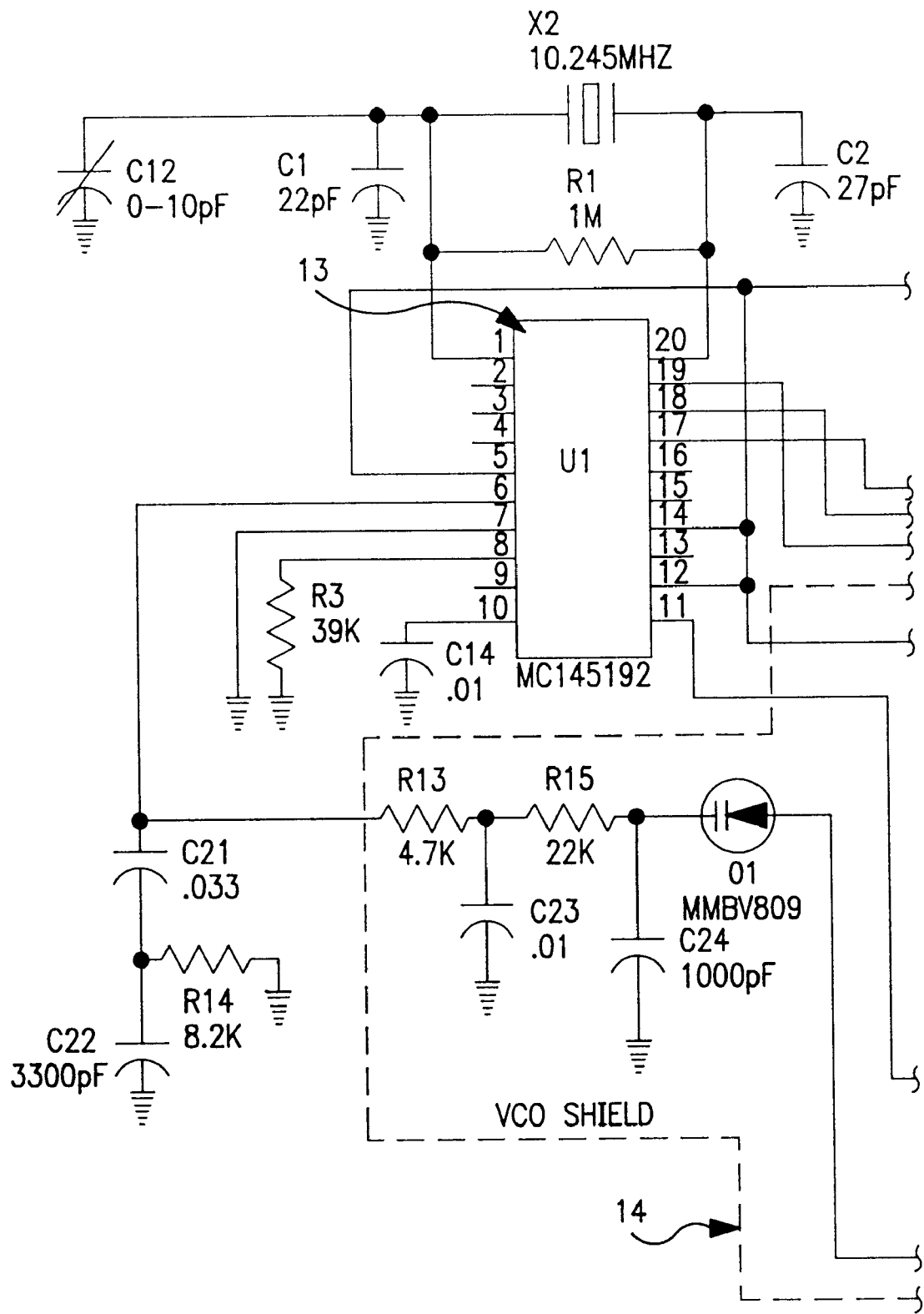
FIG. 2 is a circuit diagram for a programmable transmitter according to one embodiment of the present invention.
Figure 2B:
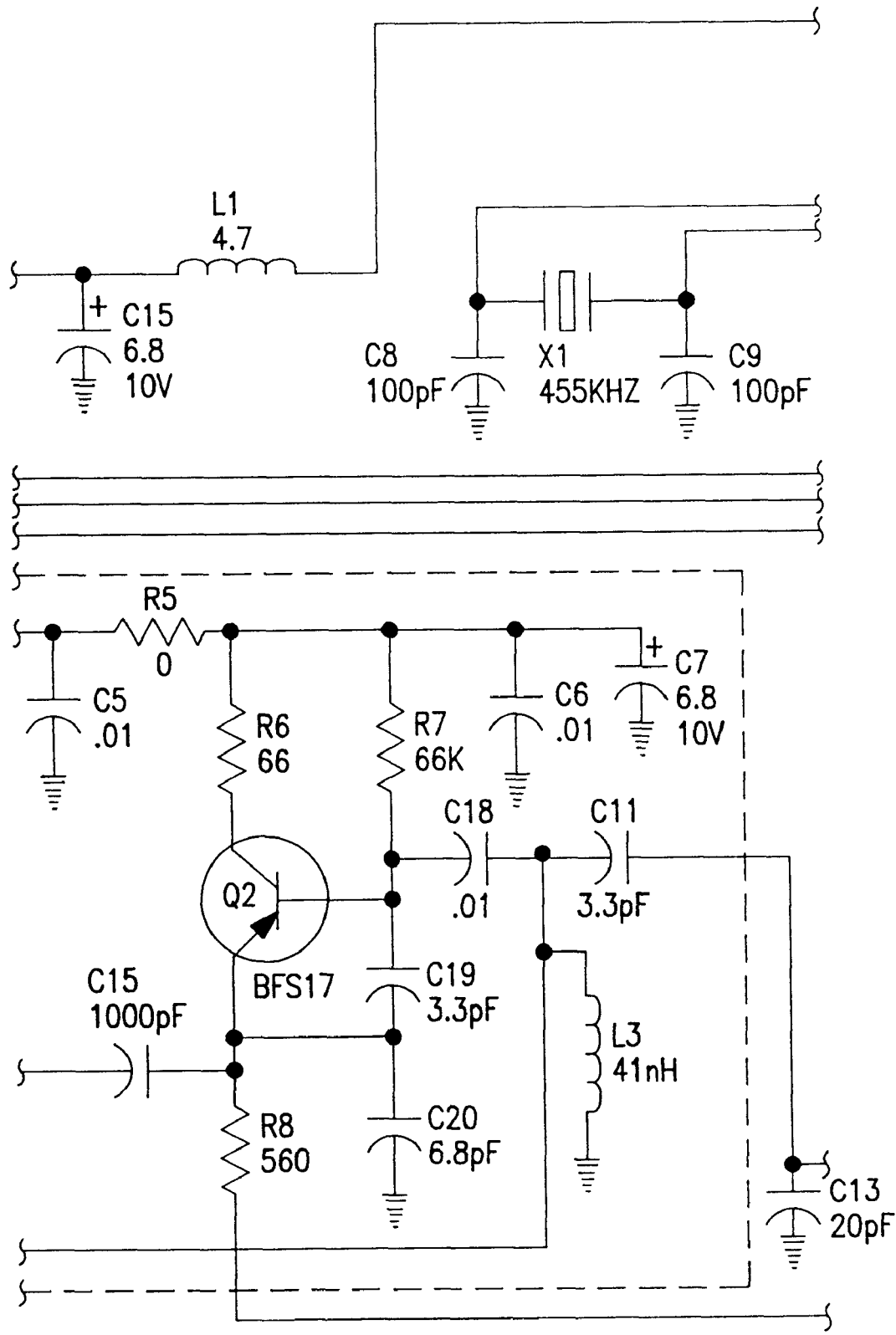
Figure 2C:
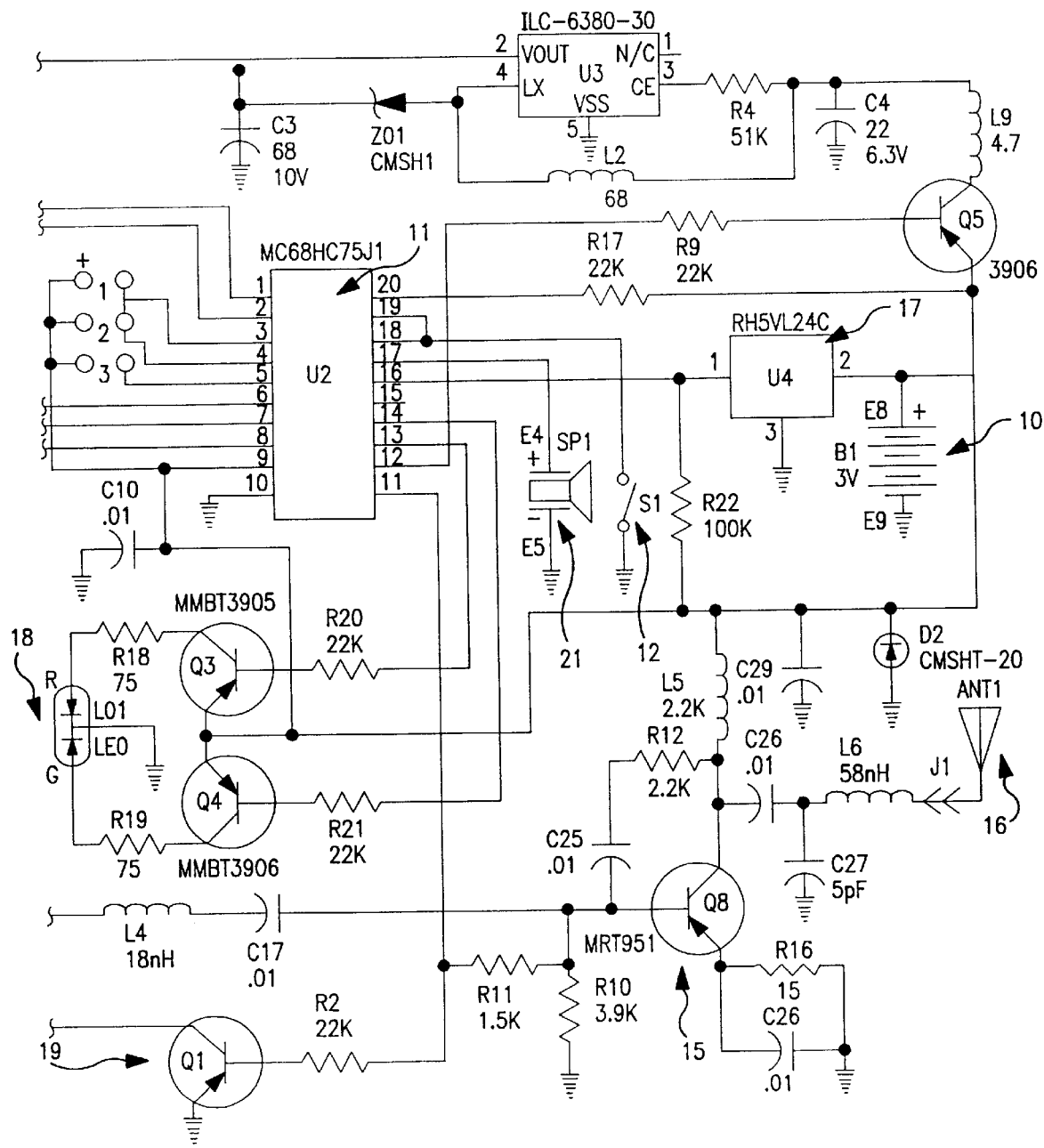

FIG. 2 is a circuit diagram of a programmable transmitter according to one embodiment of the present invention. Unless otherwise specified, the resistance values in FIG. 2 and throughout this disclosure are given in ohms, the capacitance values are given in microfarads, and the induction values are given in micro henries. Battery 10 powers the entire transmitter circuit which is controlled by microcontroller 11. As discussed in detail below, microcontroller 11 is field programmed via magnetic switch 12. Once field programmed, microcontroller 11 programs phase locked loop (PLL) synthesizer chip 13 which controls the voltage controlled oscillator (VCO) circuit 14, in such a manner to maintain a desired transmission output frequency. The output from the VCO circuit 14 is amplified by final amplifier 15 and transmitted by antenna 16.

One of the functions of microcontroller 11 is to monitor low battery conditions. This function is performed by voltage detector 17 which provides a signal to microcontroller 11 when the voltage output from battery 10 falls below a threshold level. Upon detection of a low battery condition, microcontroller 11 controls light emitting diode (LED) 18 to display a "low battery" alert. For example, LED 18 may be changed from displaying a normal "on" operating color (e.g. green) to another color (e.g. flashing red). Alternatively, separate LED's may be used to display normal operation conditions and a "low battery" condition.

The transmitter circuit is activated/deactivated, i.e. turned "on"/"off", by use of magnetic reed switch 12. Magnetic reed switch 12 is positioned within the housing of transmitter 4 (see FIG. 1) at a location which allows convenient placement of a magnet adjacent the magnetic reed switch 12 outside the transmitter housing. Once a magnet is held against the outside of the transmitter housing in the vicinity of magnetic reed switch 12, power from battery 10 activates or "wakes up" microcontroller 11. If a magnet is held against the outside of the transmitter in the vicinity of magnetic reed switch during initial activation, microcontroller 11 will automatically go into a program mode. In the circuit diagram of FIG. 2, LED 18 will flash an amber color to indicate that microcontroller 11 is in its program mode. LED 18 will continue flashing an amber color at a rate, e.g. one flash per second, which represents an increasing channel count. That is, during the program mode, each succeeding flash of LED 18 corresponds to an incrementally increasing channel count made by the microcontroller 11.

Microcontroller 11 is externally programmed by holding a magnet against the outside of the transmitter in the vicinity of magnetic reed switch 12 and counting the number of flashes of LED 18. Since each flash corresponds to an incrementally increasing channel count, one need only count the number of flashes to select a desired channel. Upon removal of the external magnet after channel selection, the microcontroller 11 programs the PLL synthesizer chip 13 to operate the VCO circuit 14 so as to produce a signal that effects transmission over the last counted channel frequency. The number of channels and the frequency represented by each channel are factory programmed into the memory of the microcontroller. Once the microcontroller 11 is externally programmed, it programs the PLL synthesizer chip 13 with the necessary data so that the transmitter transmits over a selected channel.

According to further embodiments of the present invention, magnetic means other than the magnetic reed switch 12 can be used to externally program the transmission channel selection. For example, means such as Hall effect devices, GMR (Giant Magneto Resistance) devices, AMR (Anisotropic Magneto Resistance) devices, and similar devices could be used.

In order to verify selection of a desired channel, the PLL synthesizer chip 13 echoes back the channel count using LED 18 to display a number of flashes that are equal to the programmed channel count. During this verification, LED 18 can flash a color which is different from amber, e.g. green. If a wrong channel has been programmed or the user wishes to change the channel selection, he or she merely deactivates and then reactivates the transmitter circuit in order to reinitiate programming (channel selection) of microcontroller 11.

The transmitter is deactivated or turned off by holding the magnet against the outside of the transmitter in the vicinity of magnetic reed switch 12 until the LED 18 displays a color (e.g. red) which indicates that the voltage to PLL synthesizer chip 13, and VCO circuit 14 have been turned off. At the same time the ground return for the oscillator is switched to open by transistor 19 and the base bias for the final amplifier 15 is also turned off.

During operation, microcontroller 11 turns on the VCO circuit 14 and final amplifier 15 by pulsing pin 11, thereby turning the transmitter ON/OFF at a preprogrammed duty cycle. The RF energy is delivered to external antenna 16 for purposes of radiation.

The circuit shown in FIG. 2 is designed to operate using a replaceable 3 volt lithium battery. The voltage from battery 10 is stepped up by voltage converter 20 which provides a constant 5 volt DC voltage to the PLL synthesizer chip 13 and the VCO circuit 14, thus ensuring consistent performance as battery 10 drains.

Jumpers for the microcontroller are used to determine what frequency band the transmitter will operate in (216, 217, 218, 219 or 220 MHZ). These jumpers are set at the factory. The transmitter may operate at given frequencies in each of these bands by using different software in the microcontroller, allowing for the unique factory customization of transmitter frequencies for the end user.

Figure 3A:
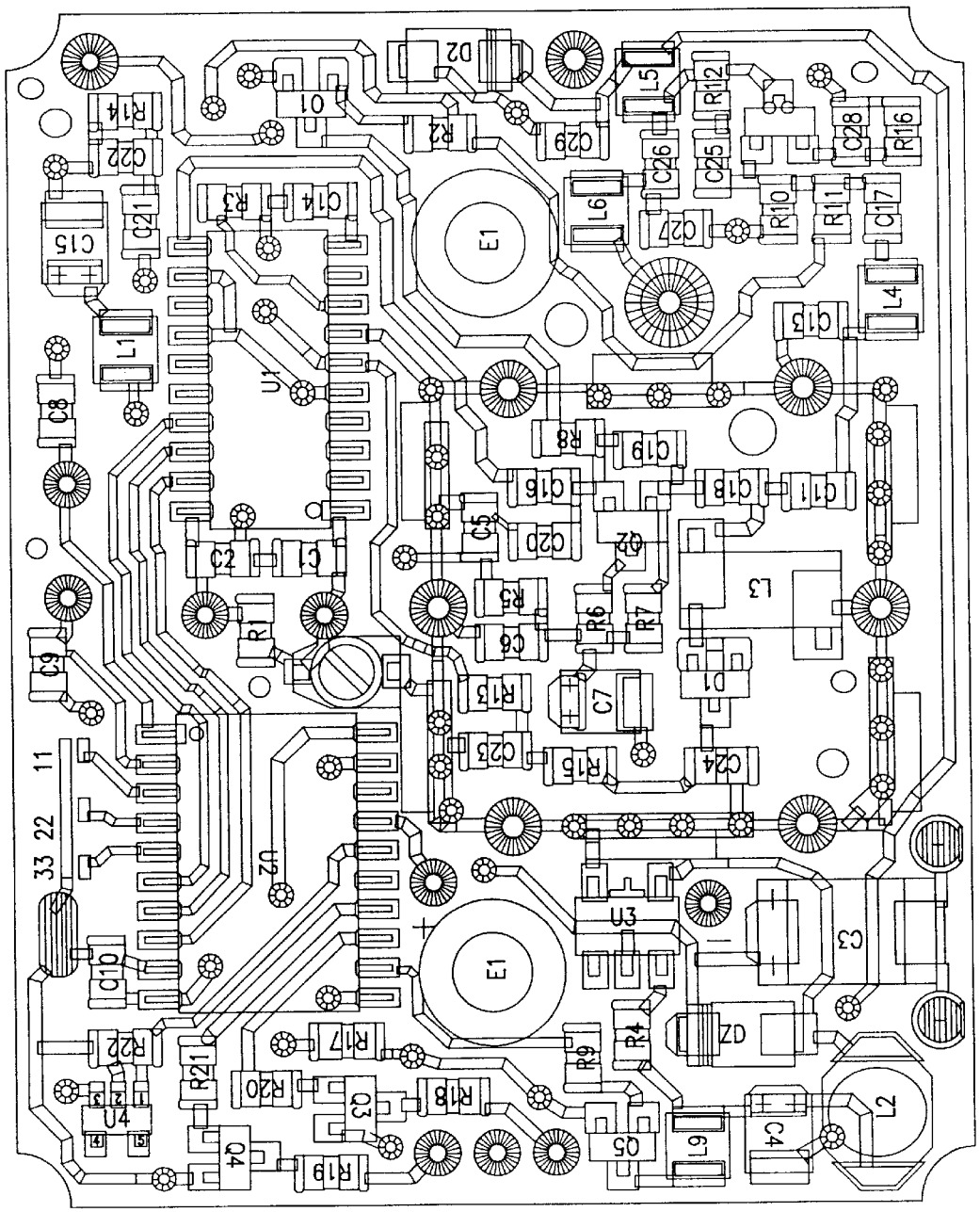
FIG. 3a is a top view of a PC board layout for the circuit of FIG. 2.
Figure 3B:
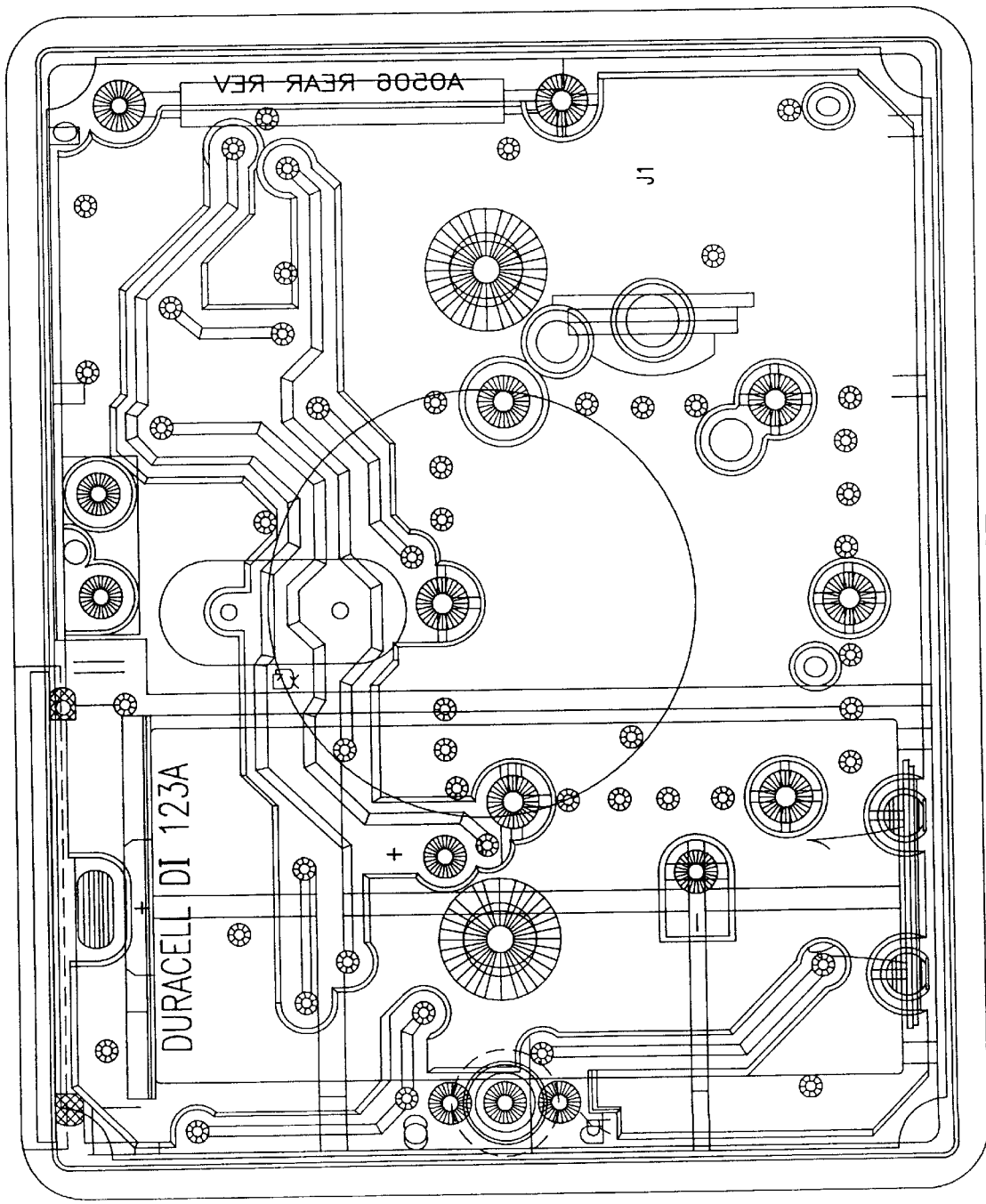

FIG. 3a is a top view of a PC board layout for the circuit of FIG. 2. FIG. 3b is a bottom view of the PC board of FIG. 3a. These figures show the dominance of surface mounted parts which allow manufacturing costs to be held low.

As described above, LED 18 provides three different colors for indicating various states of operation of the transmitter. This can be accomplished by using a tricolor LED 18 as depicted in FIG. 2. Alternatively, separate LED's can be used or other low energy display means, including liquid display crystals, optical fibers, etc. In order to provide the user with an audible cue, a piezoelectric speaker 21 can be provided. In operation, microcontroller 11 controls piezoelectric speaker 21 so that it enunciates a series of beeps in synchronization with the flashes from LED 18 during channel selection and verification. This provides the user with both an audible and visual display of channel programming.

Figure 4A:
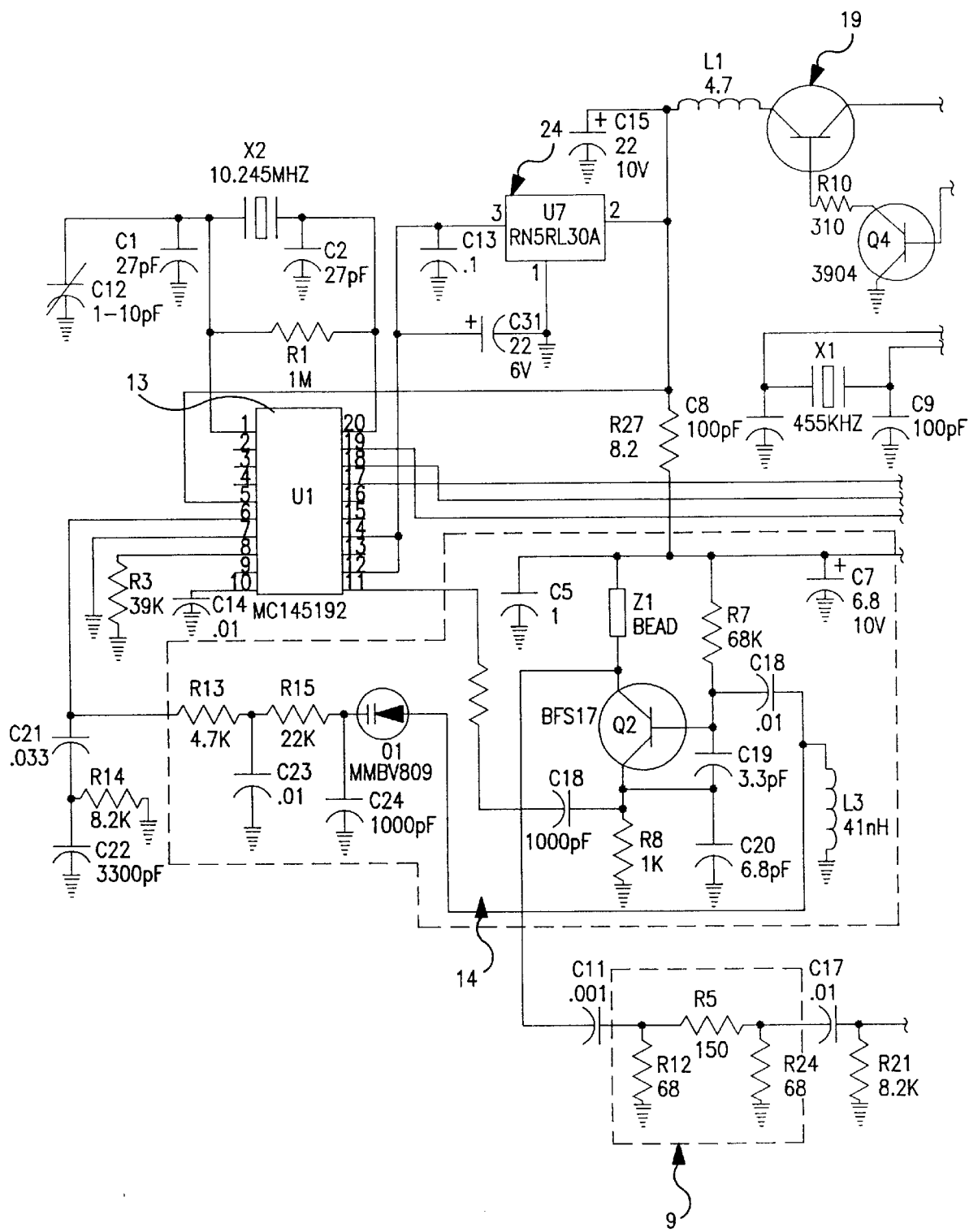
FIG. 4 is a circuit diagram for a programmable transmitter according to another embodiment of the present invention.
Figure 4B:
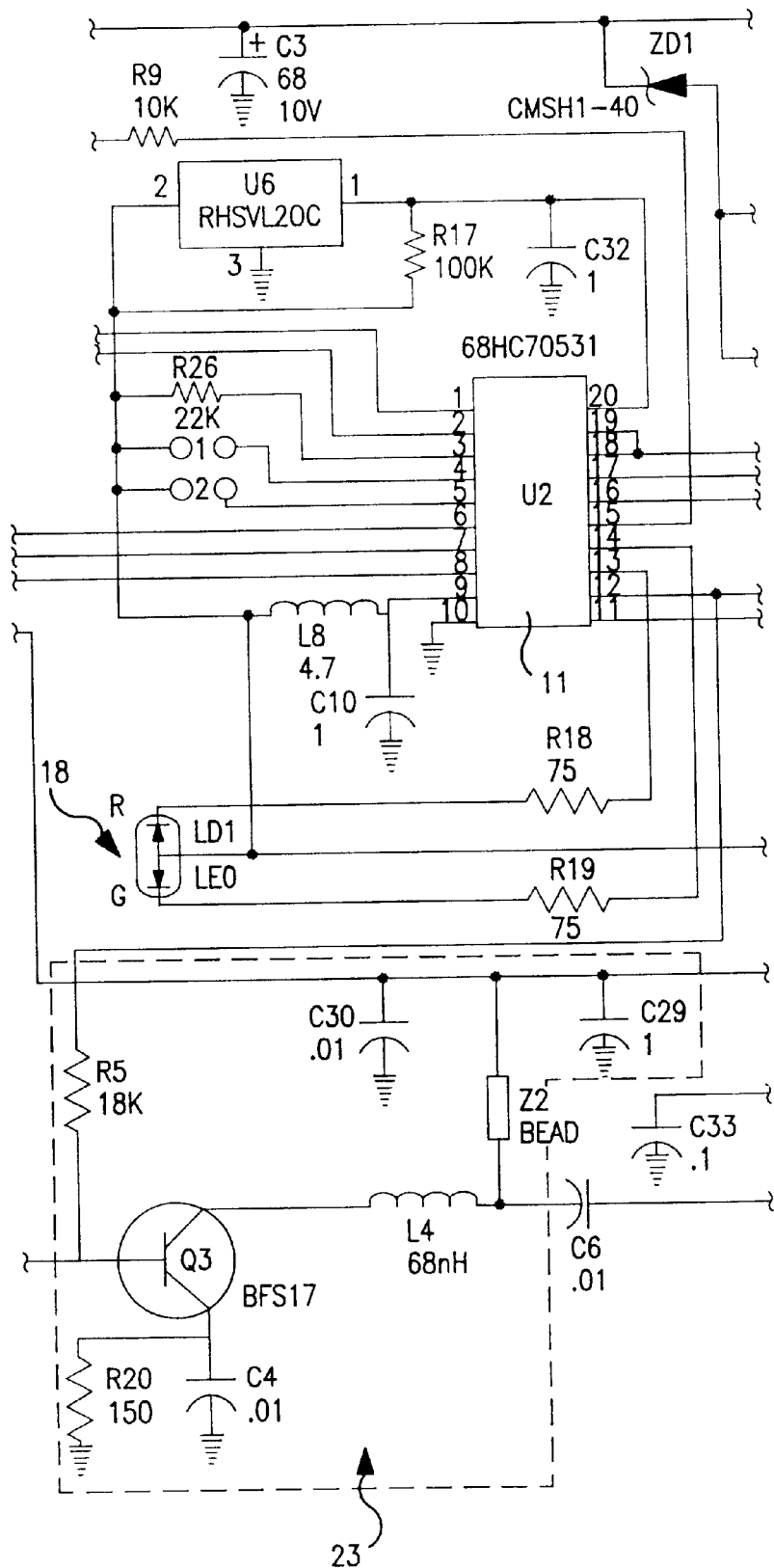
Figure 4C:
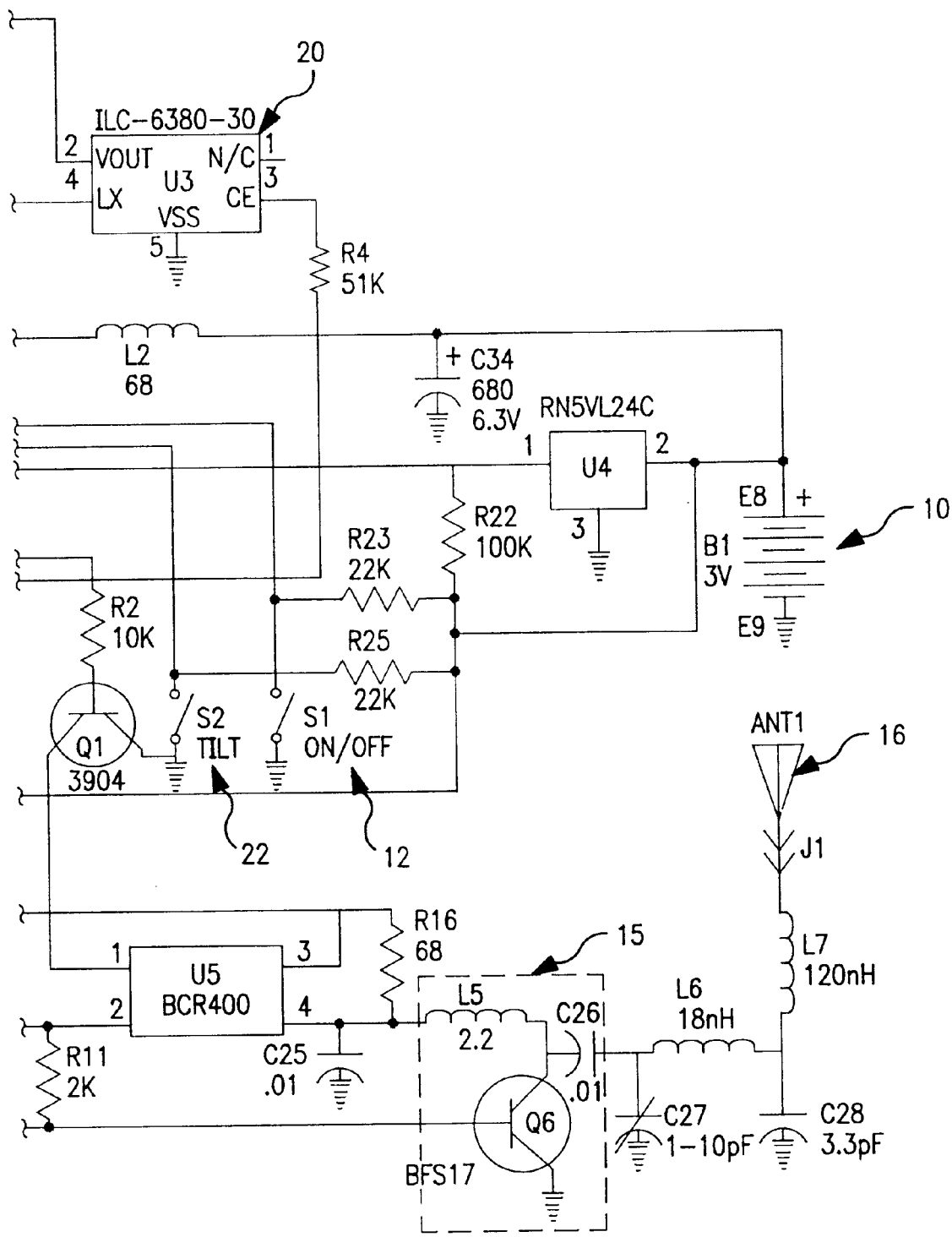

FIG. 4 is a circuit diagram for a programmable transmitter according to another embodiment of the present invention. To the extent that the circuit diagram of FIG. 4 is similar to that of FIG. 2, common reference numbers have been used to identify common components. Battery 10 powers the entire transmitter circuit which is controlled by microcontroller 11. As discussed in detail below, microcontroller 11 is field programmed via magnetic switch 12. Once field programmed, microcontroller 11 programs phase locked loop (PLL) synthesizer chip 13 which controls the voltage controlled oscillator (VCO) circuit 14, in such a manner to maintain a desired transmission output frequency. The output from the VCO circuit 14 is amplified by final amplifier 15 and transmitted by antenna 16.

One of the functions of microcontroller is to monitor low battery conditions. This function is performed by voltage detector 17 which provides a signal to microcontroller 11 when the voltage output from battery 10 falls below a threshold level. Upon detection of a low battery condition, microcontroller 11 controls light emitting diode (LED) 18 to display a "low battery" alert. For example, LED 18 may be changed from displaying a normal "on" operating color (e.g. green) to another color (e.g. flashing red). Alternatively, separate LED's may be used to display normal operation conditions and a "low battery" condition.

The transmitter circuit is activated/deactivated, i.e. turned "on"/"off", by use of magnetic reed switch 12. Magnetic reed switch 12 is positioned within the housing of transmitter 4 (see FIGS. 1 or 5) at a location which allows convenient placement of a magnet adjacent the magnetic reed switch 12 outside the transmitter housing. Once a magnet is held against the outside of the transmitter housing in the vicinity of magnetic reed switch 12, power from battery 10 activates or "wakes up" microcontroller 11. If a magnet is held against the outside of the transmitter in the vicinity of magnetic reed switch during initial activation for a longer period of time, microcontroller 11 will automatically go into a program mode. In the circuit diagram of FIG. 4, LED 18 will flash an amber color to indicate that microcontroller 11 is in its program mode. LED 18 will continue flashing an amber color at a rate, e.g. one flash per second, which represents an increasing channel count. That is, during the program mode, each succeeding flash of LED 18 corresponds to an incrementally increasing channel count made by the microcontroller 11.

Microcontroller 11 is externally programmed by holding a magnet against the outside of the transmitter in the vicinity of magnetic reed switch 12 and counting the number of flashes of LED 18. Since each flash corresponds to an incrementally increasing channel count, one need only count the number of flashes to select a desired channel. Upon removal of the external magnet after channel selection, the microcontroller 11 programs the PLL synthesizer chip 13 to operate the VCO circuit 14 so as to produce a signal that effects transmission over the last counted channel frequency. The number of channels and the frequency represented by each channel are factory programmed into the memory of the microcontroller. Once the microcontroller 11 is externally programmed, it programs the PLL synthesizer chip 13 with the necessary data so that the transmitter transmits over a selected channel.

According to further embodiments of the present invention, magnetic means other than the magnetic reed switch 12 can be used to externally program the transmission channel selection. For example, means such as Hall effect devices, GMR (Giant Magneto Resistance) devices, AMR (Anisotropic Magneto Resistance) devices, and similar devices could be used.

In order to verify selection of a desired channel, the microcontroller chip 11 echoes back the channel count using LED 18 to display a number of flashes that are equal to the programmed channel count. During this verification, LED 18 can flash a color which is different from amber, e.g. green. If a wrong channel has been programmed or the user wishes to change the channel selection, he or she merely deactivates and then reactivates the transmitter circuit in order to reinitiate programming (channel selection) of microcontroller 11.

The transmitter is deactivated or turned off by holding the magnet against the outside of the transmitter in the vicinity of magnetic reed switch 12 until the LED 18 displays a color (e.g. red) which indicates that the voltage to PLL synthesizer chip 13, and VCO circuit 14 have been turned off. At the same time power for the oscillator is switched to open by transistor 19 and the bias for the buffer amplifier 23 and final amplifier 15 is also turned off. Buffer circuit 9 buffers the load to transistor Q2 of VCO circuit 14.

During operation, microcontroller 11 turns on the VCO circuit 14 and final amplifier 15 by pulsing pins 11 and 12, thereby turning the transmitter ON/OFF at a preprogrammed duty cycle. The RF energy is delivered to external antenna 16 for purposes of radiation.

The circuit shown in FIG. 4 is designed to operate using a replaceable 3 volt lithium battery. The voltage from battery 10 is stepped up by voltage converter 20 which provides a constant 5 volt DC voltage to the PLL synthesizer chip 13 and the VCO circuit 14, thus ensuring consistent performance as battery 10 drains.

Voltage regulator 24 regulates the voltage to a digital portion of PLL synthesizer chip 13 so that the digital portion will run at the same logic levels as microcontroller 11.

Jumpers for the microcontroller are used to determine what frequency band the transmitter will operate in (216, 217, 218, 219 or 220 MHZ). These jumpers are set at the factory. The transmitter may operate at given frequencies in each of these bands by using different software in the microcontroller, allowing for the unique factory customization of transmitter frequencies for the end user.

As described above, LED 18 provides three different colors for indicating various states of operation of the transmitter. This can be accomplished by using a tricolor LED 18 as depicted in FIG. 4. Alternatively, separate LED's can be used or other low energy display means, including liquid display crystals, optical fibers, etc. Tilt switch 22 may be included and used to effect a change in the transmitted signal which change indicates a change in the orientation of the transmitter. For example, the tilt switch 22 can be used to effect a change in the transmitted signal when a dog wearing the transmitter has treed an animal.

Figure 5:
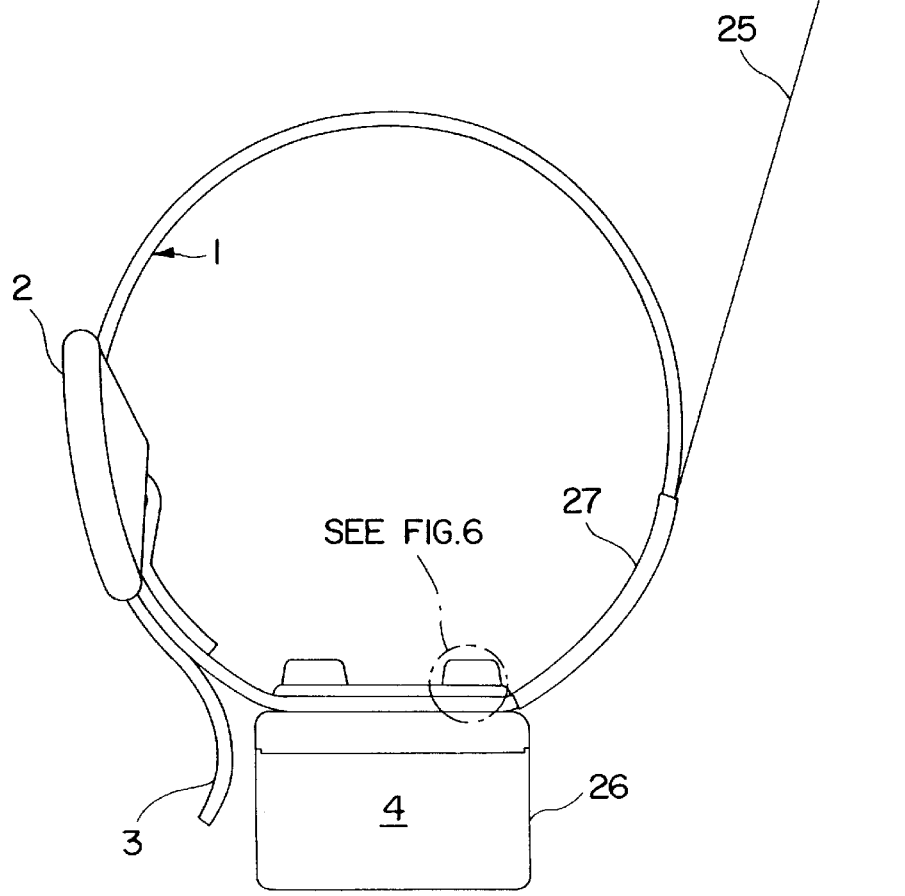
FIG. 5 is a front view of an animal collar that is equipped with a radio transmitter according to another embodiment of the present invention.

FIG. 5 is a front view of an animal collar that is equipped with a radio transmitter according to another embodiment of the present invention. The animal collar of FIG. 5 is similar to the animal collar of FIG. 1, with regard to the strap or web 1, having free end 3 and buckle 2. The animal collar of FIG. 5 includes a different flexible antenna element 25 which is mounted to the strap of web 1 rather than to the transmitter as depicted in FIG. 1.

The flexible antenna element 25 comprises a elongated metal blade member which has a curved cross-sectional shape. The flexible antenna element 25 can be made from any suitable metal such as spring steel or shape-memory materials which allow the antenna element to return to its original shape after being bent or folded. Examples of materials which are not limited to the exclusive use of metals include metal laminate plastics, metal impregnated plastics, metal coated plastics, metal plated plastics, etc.

The flexible antenna element 25 is coupled to the transmitter case 26 in the manner discussed below, and extends from the transmitter case 26 in a sleeve 27 which surrounds an adjacent portion of the strap or web 1 and keeps the flexible antenna element 25 in close proximity to the strap or web 1 of the collar along an initial length of the flexible antenna element 25. As depicted in FIG. 5, the sleeve 27 helps ensure that the free end of the flexible antenna element 25 is directed upward when the device is worn by an animal so that a signal can be properly transmitted therefrom. The sleeve 27 itself should be flexible and reasonably tight so that the portion of the flexible antenna element 25 within sleeve 27 is snug against the strap or web 1. The sleeve 27 can comprise a heat-shrinkable material which can be shrunk after the antenna element 25 and strap or web 1 are positioned therein. Alternatively, the sleeve 27 can comprise an elastomeric or polymeric material or a metallic spring or a spring made of a shape memory material into which the antenna element 25 and strap or web 1 are inserted. The sleeve 27 can be a continuous structure, or a discrete structure such as a spring, mesh or woven structure. Otherwise, the sleeve 27 can be replaced with one or more mechanical fasteners attached to strap or web 1. According to one embodiment, the sleeve 27 is merely attached to the strap or web 1 and only surrounds the antenna element 25.

In addition to directing the free end of the antenna element 25 upward, the sleeve 27 also absorbs mechanical shocks which occur when the antenna element 25 contacts or impacts objects such as brush, vegetation and other objects or obstacles. By absorbing the mechanical shocks along the portion of the antenna element 25 that is contained within the sleeve 27, the mechanical shocks are not concentrated at a single point along the antenna 25 which might be susceptible to mechanical failure.

Figure 6:
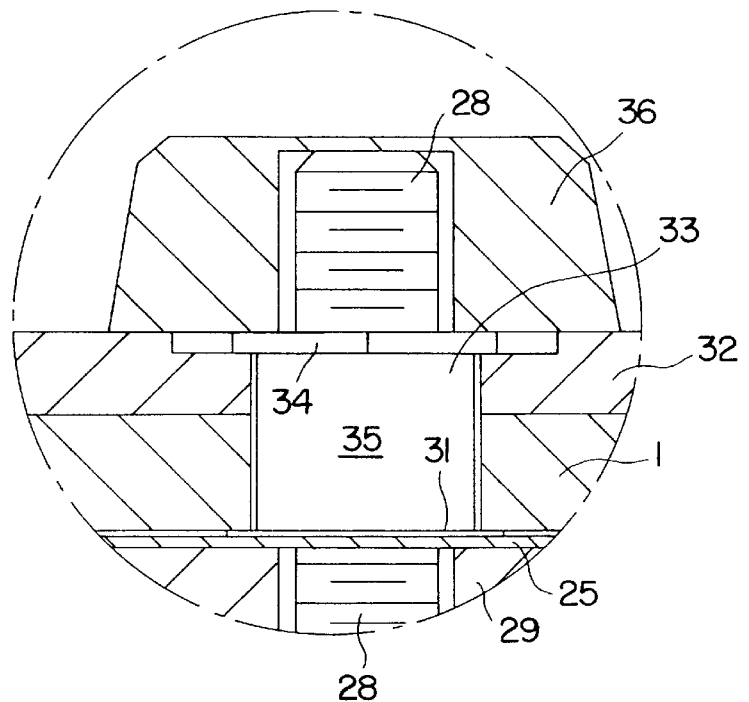
FIG. 6 is an enlarged cross-sectional view of the connection between the electrical transmitter case, antenna element and collar.

FIG. 6 is an enlarged cross-sectional view of the connection between the electrical transmitter case, antenna element and collar. The antenna element 25 includes at least one through-hole through which a threaded stud 28 attached to transmitter 4 can be inserted and used to couple antenna element 25 to the transmitter 4. The threaded stud 28 is attached at one end to a circuit board (not shown) in a known manner or to a portion of the transmitter housing. As depicted, the threaded stud 28 extends though the transmitter housing lid 29, then through through-hole in the antenna element 25. Next, a washer 31, which can be a curved spring washer is placed over the antenna element 25. The threaded stud 28 is inserted through a hole in strap or web 1 and through a cover or backing plate 32. The assembly is secured by a threaded standoff nut 33 having a flange 34. The wider portion 35 of the standoff nut 33 clamps against the washer 31 and the flange 34 clamps against the cover or backing plate 32 as depicted. The end of the threaded stud which extends from the cover or backing plate 32 is covered by a threaded stud cap 36 which prevents the otherwise exposed end of the threaded stud 28 from irritating an animal's neck.

Figure 7:
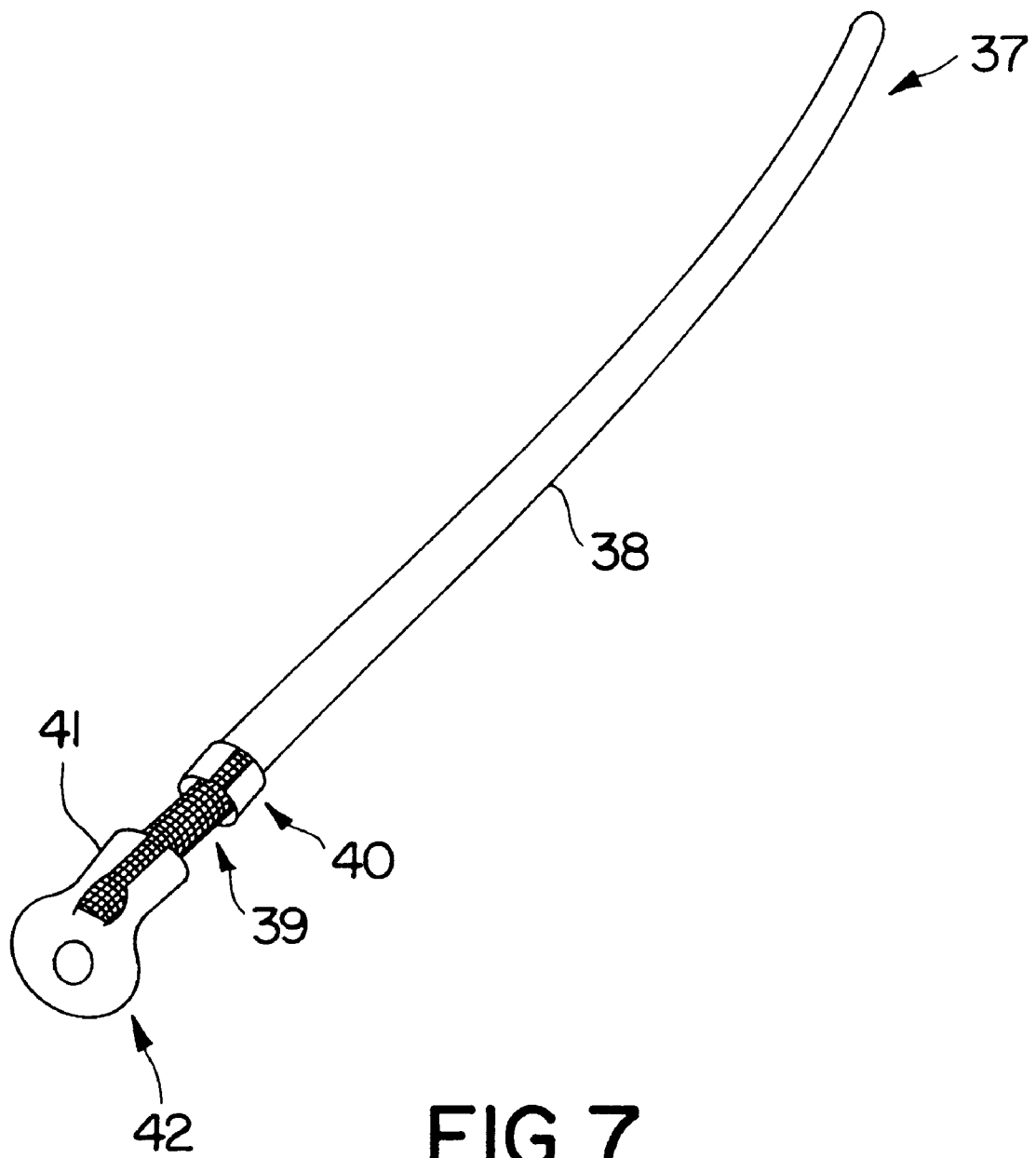
FIG. 7 is a side view of another embodiment of an antenna element.

FIG. 7 is a side view of another embodiment of an antenna element. The antenna element of FIG. 7 includes a wirewound cable section 37 which is similar in configuration to a speedometer cable. The wirewound cable section 37 is covered by a protective, weather resistant coating 38 such as a plastic or elastomeric material. One end of the wirewound cable section 37 has a portion of the protective coating 38 removed to expose the underlying wirewound cable 37. A small section of wire mesh 39 is slid over the exposed portion of the wirewound cable 37 and secured thereto by a clamp 40. The other end of the wire mesh 39 is secured by a clamp 41 to an eyelet 42.

FIG. 7 depicts one manner by which wirewound cable section 37 can be coupled to an eyelet 42. The eyelet 42 is in turn used to couple the antenna element 25 to the electrical transmitter as discussed above. That is, the hole in eyelet 42 is used in place of the through-hole in the end of the antenna element 25 of FIGS. 5 and 6. It is to be understood that there are other means to couple the wirewound cable section 37 to the eyelet 42. For example, one or more flexible wires, a conductive spring, a flat wire mesh, etc. could be used in place of a cylindrical portion of wire mesh. Moreover, the clamps 40 and 41 could be replaced by a soldered or welded connection.

Although the present invention has been described with reference to particular means, materials and embodiments, from the foregoing description, one skilled in the art can easily ascertain the essential characteristics of the present invention and various changes and modifications may be made to adapt the various uses and characteristics without departing from the spirit and scope of the present invention set forth in the appended claims.

What is claimed is:

1. A tracking device which comprises:

a collar;

a transmitter mounted to the collar in a transmitter housing; and a flexible antenna extending from the transmitter housing, wherein the transmitter comprises a multichannel transmitter which includes a magnetically operable circuit which allows external programmability of transmission channel selection.

2. A tracking device according to claim 1, wherein the magnetically operable circuit includes a magnetic reed switch.

3. A tracking device according to claim 1, wherein the transmitter includes a multicolored LED which displays a first color to indicate channel selection during programming and a second color to verify channel selection.

4. A tracking device according to claim 3, wherein the transmitter includes a circuitry to detect low battery conditions and the multicolored LED displays a third color to indicate low batter conditions.

5. A tracking device according to claim 1, wherein the flexible antenna comprises an elongate blade having a curved cross-sectional shape.

6. A tracking device according to claim 5, wherein a portion of the flexible antenna is positioned in a sleeve member which is coupled to the collar.

7. A tracking device according to claim 6, wherein a portion of the collar is positioned in the sleeve member.

8. A tracking device according to claim 1, wherein the flexible antenna comprises a length of wirewound cable.

9. A tracking device according to claim 8, wherein a portion of the flexible antenna is positioned in a sleeve member which is coupled to the collar.

10. A tracking device according to claim 9, wherein the flexible antenna further comprises an eyelet for coupling the flexible antenna to the transmitter and a flexible connection between the eyelet and the wirewound cable.

11. A tracking device which comprises:
    a collar;
    a transmitter mounted to the collar in a transmitter housing; and
    a flexible antenna extending from the transmitter housing,
    wherein the transmitter comprises a programmably chanelized multichannel transmitter.

12. A tracking device according to claim 11, wherein the transmitter includes a multicolored LED which displays a first color to indicate channel selection during programming and a second color to verify channel selection.

13. A tracking device according to claim 12, wherein the transmitter includes a circuitry to detect low battery conditions and the multicolored LED displays a third color to indicate low battery conditions.

14. A tracking device according to claim 11, wherein the flexible antenna comprises an elongate blade having a curved cross-sectional shape.

15. A tracking device according to claim 14, wherein a portion of the flexible antenna is positioned in a sleeve member that is coupled to the collar.

16. A tracking device according to claim 15, wherein a portion of the collar is positioned in the sleeve member.

17. A tracking device according to claim 11, wherein the flexible antenna comprises a length of wirewound cable.

18. A method of externally programming a multichannel transmitter which comprises:
    providing a multichannel transmitter with a microcontroller and magnetically operable circuit which allows external programmability of transmission channel selection;
    activating the magnetically operable circuit for a first period of time to activate a microcontroller;
    activating the magnetically operable circuit for a second period of time to cause the microcontroller to initiate a verified channel count; and
    stopping activation of the magnetically operable circuit when the microcontroller has verified a desired channel count.

19. A method of externally programming a multichannel transmitter according to claim 18, further comprising:
    providing the multichannel transmitter with a phase locked loop synthesizer and a voltage controlled oscillator circuit;
    using the microcontroller to program the phase locked loop synthesizer; and
    using the phase locked loop synthesizer to operate the voltage controlled oscillator circuit to produce a signal that effects transmission over the desired channel.

* * * * *